United States Patent [19]
Dockser

[11] Patent Number: 6,006,030
[45] Date of Patent: Dec. 21, 1999

[54] MICROPROCESSOR WITH PROGRAMMABLE INSTRUCTION TRAP FOR DEIMPLEMENTING INSTRUCTIONS

[75] Inventor: Kenneth A Dockser, San Jose, Calif.

[73] Assignee: VLSI Technology, Inc., San Jose, Calif.

[21] Appl. No.: 08/948,189

[22] Filed: Oct. 9, 1997

Related U.S. Application Data

[63] Continuation of application No. 08/390,195, Feb. 17, 1995, abandoned.

[51] Int. Cl.$^6$ ........................................................ G06F 9/00
[52] U.S. Cl. ................................................ 395/568; 395/591
[58] Field of Search ..................................... 395/568, 591

[56] References Cited

U.S. PATENT DOCUMENTS

| | | | |
|---|---|---|---|
| 5,226,122 | 7/1993 | Thayer | 395/500 |
| 5,381,530 | 1/1995 | Thayer | 395/825 |
| 5,475,852 | 12/1995 | Yoshida et al. | 395/183.1 |
| 5,479,616 | 12/1995 | Garibay et al. | 395/388 |
| 5,481,685 | 1/1996 | Nguyen et al. | 395/591 |
| 5,632,028 | 5/1997 | Thusoo et al. | 395/500 |

OTHER PUBLICATIONS

VY86C060 Architectural Overview, VLSI Technology, San Jose, Jan., 1994, pp. 6–10.

"ARM FPA10 Data Sheet", ARM, Limited, Cambridge, England., 1993, pp. 16–17.

Flynn, Laurie, "Intel Facing a General Fear of Its Pentium Chip", *New York Times*, Dec. 19, 1994 (copy downloaded from America Online, Inc.) no page numbers.

*ARM70DM Data Sheet*: Chapter 9: Debug Support Hardware, ARM Limited, Cambridge, England, Jul. 1993, pp. 105–109.

*Primary Examiner*—Parshotam S. Lall
*Assistant Examiner*—Kenneth R. Coulter
*Attorney, Agent, or Firm*—Clifton L. Anderson

[57] ABSTRACT

A microprocessor includes a programmable instruction trap that can be used to deimplement instructions that lead to erroneous results. Upon discovery of a logic design defect, a microprocessor manufacturer can distribute an updated exception handler and a patch for a boot sequence. Upon power up, the boot sequence programs instructions to be deimplemented into a trap list. Each received instruction (issued by an application program, for example) not matching any listed instruction is executed in due course. When it matches a listed deimplemented instruction, the received instruction is trapped: it is not executed but is stored in a dedicated register. An exception handler is called that can examine the trapped instruction and substitute a suitable routine. If the trapped instruction is conditionally deimplemented and the problematic conditions do not pertain, the exception handler can reissue the instruction after temporarily deactivating the trapping function. Once the exception handler is done, the interrupted application program can resume.

8 Claims, 2 Drawing Sheets

MICROPROCESSOR WITH PROGRAMMABLE INSTRUCTION TRAP FOR DEIMPLEMENTING INSTRUCTIONS

This is a continuing application of U.S. patent application Ser. No. 08/390,195, filed Feb. 17, 1995, now abandoned.

BACKGROUND OF THE INVENTION

The present invention relates to microprocessor systems and, more particularly, to a system and method for preventing execution of selected implemented instructions on a microprocessor. A major objective of the present invention is to provide for effective utilization of a defectively designed microprocessor.

Much of modern progress is associated with advances in computer performance. Recent computers typically use one or more microprocessors to execute desired operations. Each microprocessor design is characterized by the set of "implemented" instructions it can recognize and execute. The instructions have a respective instruction format.

In many cases, the format can provide for "unimplemented" instructions that the microprocessor is not designed to execute. These unimplemented instructions are of two types: 1) defined but omitted; and 2) undefined (or "reserved"). Many processors are members of processor families that can include more and less sophisticated versions; some instructions that are implemented (and thus defined) on the more sophisticated versions are omitted on the less sophisticated versions. For example, floating-point instructions are defined but omitted on versions of microprocessors with nonfunctional floating-point units (Intel 486SX, Motorola 68LC040). "Undefined" instructions are not defined for any processor, but remain "reserved" for processors yet to be designed.

Microprocessors typically include some means for handling unimplemented instructions. For example, upon detection of an unimplemented instruction in a running application program, a microprocessor can access a software exception handler. The handler can retrieve the unimplemented instruction from memory and determine a suitable course of action. (For example, a floating-point operation can be executed in software if the microprocessor does not have a floating-point unit.) The exception handler can also store as much of the microprocessor's state as necessary for proper restoration before the interrupted application program resumes.

Because they are so widely used, in critical as well as non-critical applications, microprocessor designs are exhaustively tested. However, as integrated circuit density has grown exponentially, so has the number of implemented logic functions. Design testing, using both simulation and prototypes, has also developed to permit more sophisticated confirmation of logic designs. However, the ability to implement functions in an integrated circuit is expanding faster than the ability to test the designs. Accordingly, it has become inevitable that a popular microprocessor would appear with a significant logic design error.

The inevitable became the actual in 1994 when a user identified a design defect in the Pentium processor from Intel Corporation. In some cases, a floating-point divide instruction yielded an erroneous result. As more complex processors are designed, such logic design defects can be expected to recur. Given that they are inevitable, the challenge becomes how to handle them once they are discovered.

Intel tried several approaches to addressing the Pentium defect. The first approach was to keep the defect secret while they worked on a redesign. While economical from a manufacturer's standpoint, this approach has proved unpopular with users that had to discard months of work due to uncertainties in the computations relied upon that arose once the defect was disclosed. The second approach was to offer a limited exchange only for those users who could demonstrate that the defect would affect them. This limited exchange approach was also unpopular because it placed a burden of proof on users, and threatened to leave other good faith purchasers to rely on a processor known to be defective.

A more popular approach was an open exchange of a defective processor with a corrected version of the processor. However, this is potentially a very costly solution as two processors are shipped for the price of one. The economics of the exchange can be much worse where the updated processor turns out to have subsequently discovered defects that require a further exchange.

There are also software-based solutions. For example, a software monitor program can examine an instruction stream in real time to detect for problematic instructions. This approach is problematic because the instructions of the monitor must be executed for each program instruction, exacting a substantial performance penalty even for programs that do not use the problematic instructions. In addition, there is a significant potential for incompatiability with available software.

The performance penalty could be eliminated largely by recompiling programs to eliminate the offending instruction. The recompiling could be done "off-line". Intel provided such a solution involving multiplying dividends and divisors by $15/16$. If this recompiling is to be performed by the user, it would be extremely difficult without program source code; in general, a user would not have access to source code for commercially available programs. The software manufacturers could perform the recompiling, but then there is the cost and difficulty of reaching the consumers with the recompiled program. In some cases, recompiling might violate a software license agreement. Moreover, a performance penalty would be suffered (relative to the unrecompiled program) when the processor was upgraded or the program transferred to another computer system with a different but related processor.

What is needed is a better approach to dealing with logic design defects in installed microprocessors. This approach should preserve user expectations for the processor as well as the financial expectations of the manufacturer and distributors. Recompiling should not be required; performance penalties and compatibility problems should be minimized.

SUMMARY OF THE INVENTION

In accordance with the present invention, a microprocessor includes a programmable trap for selectively allowing and preventing its execution unit (or other means) from executing designated instructions when they are received. The trap provides for conditional and/or unconditional deimplementation of implemented instructions.

The trap includes writable storage, a detector, and an exception register. The identities of a set of "deimplemented" instructions are written into the storage. The detector determines whether an instruction received for execution matches one of the stored identities.

Upon detection of such a match, the trap prevents the execution unit from executing the deimplemented instruction. Instead, an exception handler is called; to give the exception handler access to it, the trapped instruction is stored.

If the trapped instruction is conditionally problematic, the exception can determine whether the conditions pertain or not. If the problematic conditions pertain or if the instruction is unconditionally problematic, the exception handler can issue a substitute routine to implement the function that was supposed to be implemented by the trapped instruction. If the problematic conditions do not pertain, the exception handler can reissue the trapped instruction.

It would be futile to reissue a deimplemented instruction only to have it trapped again. Accordingly, the trap can have alternative trapping and nontrapping modes. In trapping mode, deimplemented instructions are trapped as described above. In nontrapping mode, the trap permits a deimplemented instruction to be executed by the execution function. Trap mode can be controlled by instructions that can be issued by the exception handler. Alternatively, nontrapping mode can be entered automatically (without a mode instruction) upon detection of a deimplemented instruction while the trap is in trapping mode.

Both the programming of the writable storage and the setting of the trap mode can be under control of implemented instructions. For example, the writable storage and a mode flag can be assigned addresses corresponding to external memory, internal registers, or to coprocessor registers. Instructions that write to these addresses provide for trap programming and mode control. Alternatively, instructions that were undefined in a previous incarnation of a family of processors can be dedicated to trap programming and mode control.

A method of the invention begins with selection of instructions to be deimplemented by a suitable "program-trap" sequence of implemented instructions. Subsequently, for example, while running an application program, an incoming instruction steam is monitored for deimplemented instructions. Implemented instructions that are not deimplemented are executed. Upon detection of a deimplemented instruction, the deimplemented instruction is withheld from execution and is stored in the exception register.

In one realization of the present invention, nontrapping mode is set automatically upon a trap before the execution handler is called. In the preferred realization, trapping mode is entirely under the control of instructions so that the exception handler can set the trap mode to nontrapping to allow a deimplemented instruction that it issues to be executed. In either case, the exception handler can issue an instruction forcing a switch to trapping mode once the nontrapping mode is no longer required. An advantage of the preferred realization is that an instruction to switch to trapping mode can be omitted in cases where the exception handler never requires the trap to enter the nontrapping mode. Upon completion of the execution handler, the method returns to running the application or other interrupted program.

A microprocessor manufacturer, upon discovery of one or more defectively implemented instructions, can distribute, e.g., via on-line services, software to users and retailers to remedy the defect. The software is designed to program the trap and handle exceptions called in response to a trap. For example, the software can include a patch for a boot sequence that when pitched will write the instructions to be deimplemented into the writable storage of the-trap each time the incorporated computer is turned on. In addition, the software can include an updated exception handler to handle calls due to deimplemented instructions as well as calls due to instructions that are unimplemented by design.

This solution to defective logic designs is inexpensive, is unlikely to suffer substantial problems with compatibility, and imposes no significant performance penalty on programs that do not use a deimplemented instruction. While performance penalties will be suffered when instructions are trapped, these can be minimized by an efficient exception handler. These and other features and advantages are apparent from the description below with reference to the following drawings.

DESCRIPTION OF THE PREFERRED EMBODIMENTS

Figure 1:
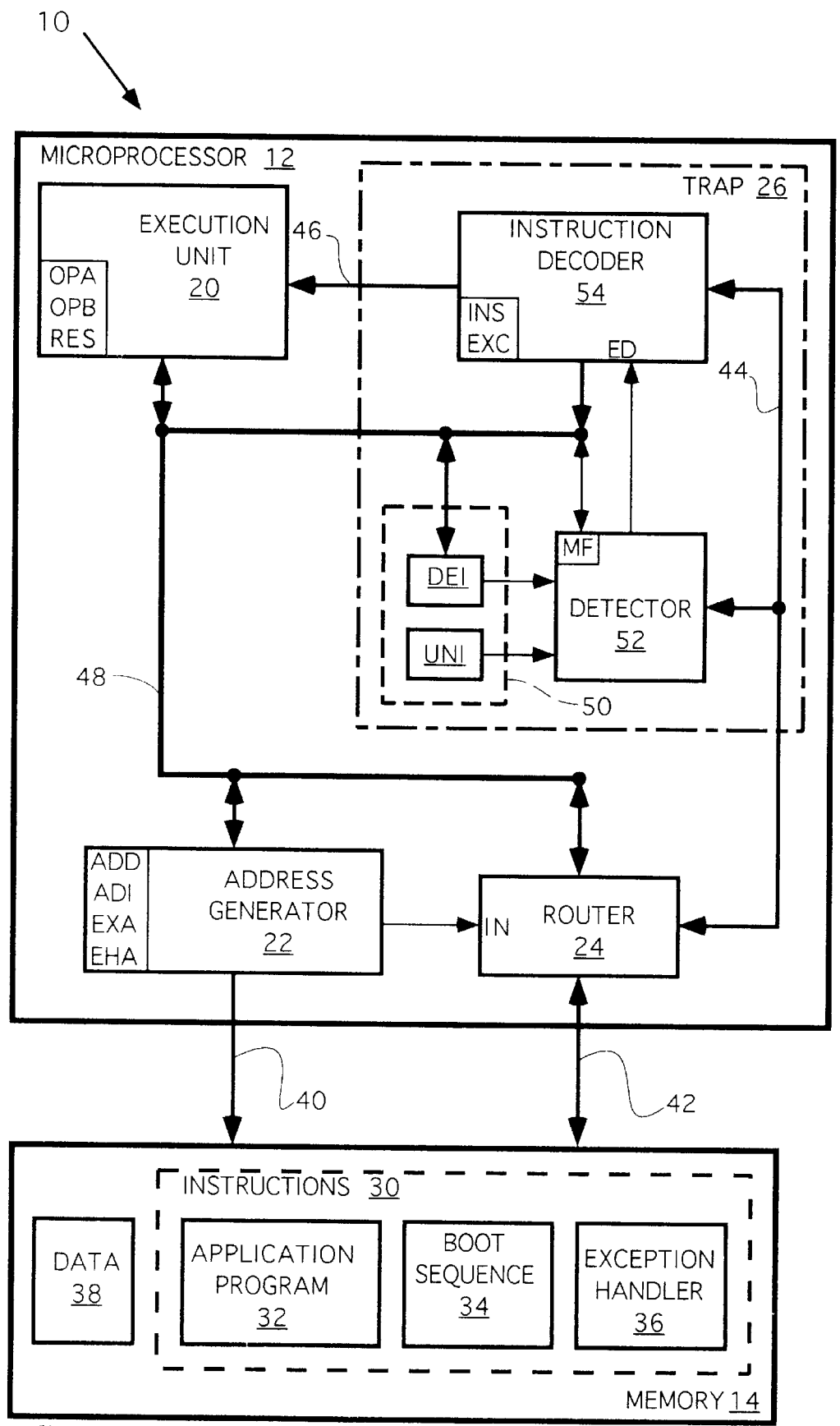
FIG. 1 is a schematic diagram of computer system with a microprocessor having a programmable instruction trap in accordance with the present invention.

A computer system 10 includes a microprocessor 12 and external memory 14, as shown in FIG. 1. Microprocessor 12 includes an execution unit 20, an address generator 22, a router 24, and an instruction trap 26. Execution unit 20 executes instructions of a set of implemented instructions. Execution unit 20 includes several registers; these registers include registers OPA and OPB, typically used for storing operands, and register RES, typically used for storing the results of operations.

Instructions 30 to be executed by execution unit 20 are stored in external memory 14. These instructions are arranged in programs including an application program 32, a boot sequence 34, and an exception handler 36. In addition, memory 14 stores data 38 that can be used in executing instructions and that can result from their execution. Typical instructions provide for reading data from specified locations in external memory to specified registers such as OPA and OPB, performing an operation on the contents of registers OPA and OPB and storing the result in register RES, and writing the contents of register RES to a specified address in external memory 14.

Address generator 22 implements requests for instruction fetches and data transfers by generating suitable external memory addresses and transmitting these along with suitable control signals (e.g., "read" versus "write") along an address bus 28. When an instruction fetch is required, address generator 22 transmits the address and a "read" signal to memory 14 along an address bus 40. Memory 14 transmits the requested contents along a content bus 42. Concurrently, address generator 22 provides an "instruction" indication to an "instruction" input IN of router 24. In response to the "instruction" indication, router 24 routes the instruction received along content bus 42 to trap 26 via an internal instruction bus 44. Unless the instruction is trapped, it is decoded and transmitted to execution unit 20 in the form of control signals along control bus 46.

When a data read is required by an instruction, address generator 22 transmits the corresponding address and a "read" control signal along address bus 40. Address generator 22 withholds the "instruction" indication from router 24. In the absence of the "instruction" indication, router 24 routes the data received along content bus 42 to an internal data bus 48, which typically conveys the read data to execution unit 20. A data write is similar to a data read except that address generator 22 issues a "write" control signal instead of "read" control signal. Data, typically from execution unit 20, is transferred along internal data bus 48 through router 24 along external content bus 42 to the addressed location of memory 14.

Address generator 22 includes several registers including a data address register ADD, an instruction address register ADI, an exception address register EXA, and an exception handler address register EHA. Data address register ADD stores the most recently requested data address, while instruction address register ADI stores the most recently requested instruction address. When trap 26 indicates to address generator 22 that a trap has occurred, the contents of instruction register ADI are copied to exception address register EXA and the contents of exception handler address register EHA are copied to instruction register ADI. The address stored in register EHA corresponds to the location of exception handler 36, which is thus called when a trap occurs.

Trap 26 includes a list 50, a detector 52, and an instruction decoder 54. List 50 includes a read-only section UNI in which the identities of unimplemented instructions are indicated. List 50 also includes a writable section DEI in which the identities of deimplemented instructions can be stored. Writable section DEI is assigned addresses in coprocessor register space and is coupled to data bus 48 for receiving instructions to be written and suitable write control signals from execution unit 20. Execution unit 20 causes such instructions to be written to section DEI in response to corresponding "write coprocessor register" instructions.

List 50 includes not only locations for storing instructions but also mask registers for each location. The mask registers of section DEI are writable. For each stored instruction, the mask register determines which instruction bits are relevant for matching. For example, the relevant bits can be those that specify an operation, such as "divide", whereas the irrelevant bits can be those that specify the registers in which the dividend and divisor are to be found. The irrelevant bits are treated as search "wild cards" in determining matches. In this way, a single instruction location can indicate the identities of up to $2^n$ instructions, where n is the number of irrelevant bits. Like the deimplemented instruction locations, the associated mask registers are assigned coprocessor register addresses and can be written to using "write coprocessor register" instructions.

Detector 52 is coupled to instruction bus 44 for receiving fetched instructions in sequence. Detector 52 has alternative "detect" and "neglect" modes of operation which correspond directly with trapping and nontrapping modes of trap 26. The mode of detector 52 (and thus of trap 26) is determined by the setting of a mode flag MF of detector 52. Mode flag MF is assigned a coprocessor register address and is coupled to data bus 48 so that it can be written to by execution unit 20 in response to corresponding "write coprocessor register" instructions.

When in its detect mode, detector 52 determines for each instruction received along instruction bus 44 whether it matches any of the identities in list 50 (taking only relevant bits into account). If it does, detector 52 issues an exception detection signal to decoder 54 at its "exception detection" input ED. If all mask bits for an instruction location are set to "irrelevant", detector 52 treats this list location as "empty" and no match can be indicated for this list location. Accordingly, upon system reset, all mask bits are set to "irrelevant". In its neglect mode, detector 52 issues exception detections only for unimplemented instructions, not for deimplemented instructions.

Decoder 54 receives instructions along instruction bus 44 in parallel with detector 52. Each received instruction is stored in an internal "instruction" register INS and decoding is begun. Unless decoding is interrupted, the decoded instruction is transferred to execution unit 20 for execution.

When a "exception indication" is received at decoder input ED, decoding is interrupted so that the instruction is not executed. Instead, the instruction in register INS is transferred to an included exception register EXC. In addition, instruction decoder 54 signals along data bus 48 to address generator 22 that a trap has occurred. The current address pointer in register ADI is transferred to exception address register EXA, the exception handler address in register EHA is transferred to instruction address register ADI. Address generator 22 maintains an instruction indication to router 24. Accordingly, exception handler 36 is initiated.

The functions implemented by exception handler 36 are dependent on the instructions that have been deimplemented. In most cases, the exception handler retrieves the trapped instruction from decoder register EXC. An appropriate substitute routine can be issued if the instruction is unimplemented, if the instruction is unconditionally deimplemented, or if the instruction is conditionally deimplemented and the problematic conditions pertain (e.g., in the case the divisor turns out to be in a range in which division yields an erroneous result). If the instruction is conditionally deimplemented and the problematic conditions do not pertain, the exception handler can switch the trap mode to nontrapping, reissue the instruction, and reset the mode to trapping. Generally, the exception handler can turn off trapping temporarily during a substitute routine that requires deimplemented instructions to be executed.

The exception handler should be invisible (except for timing delays) to the interrupted application program. Accordingly, the exception handler can copy to external memory the contents of any microprocessor registers that would otherwise be overwritten by the exception handler. The contents can be used and/or restored by the exception handler to achieve the result that would have been achieved had the deimplemented instruction been correctly implemented. In addition, the exception handler can instruct that the contents of register EXA be transferred to instruction address register ADI (with a suitable offset if required) to resume operation of the application program.

Figure 2:
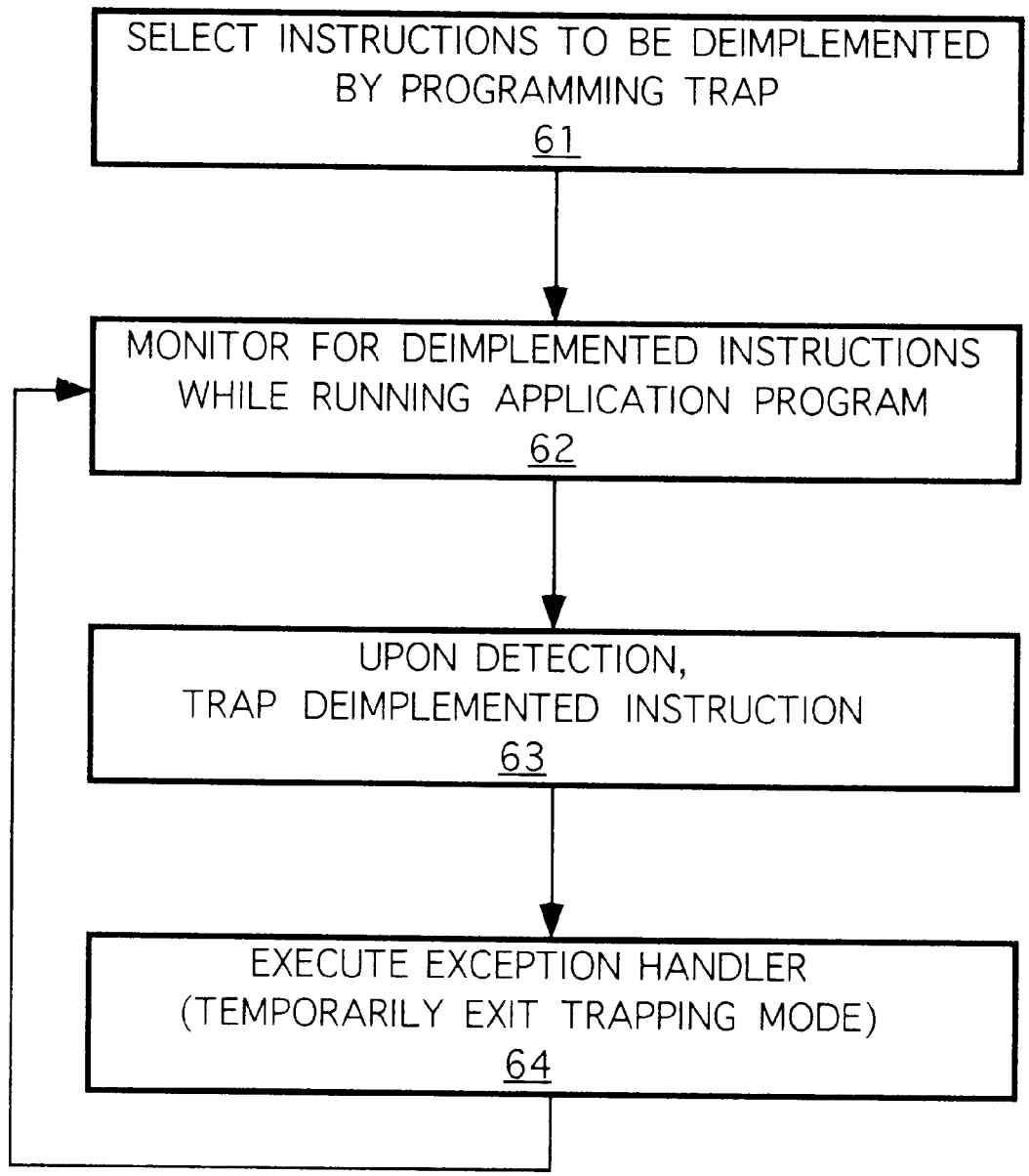
FIG. 2 is a flow chart of a method of the invention practiced in in the context of the system of FIG. 1.

A method 60 of the invention is flow charted in FIG. 2. The implemented instructions to be deimplemented are selected by programming the trap at step 61. When computer 10 is turned on, boot sequence 34 runs. Boot sequence 34 has been patched with instructions that write the identities of deimplemented instructions (along with associated masks) into list section DEI.

Once the computer is booted up and list section DEI is programmed, trap 26 monitors any incoming instructions for a match with instructions identified in list 50 at step 62. Trap 26 monitors irrespective of the type of program that is running, but in general monitoring occurs whenever an application program, e.g., spreadsheet, graphics, word processing, is running.

When a match is detected, the instruction is trapped at step 63. In other words, the instruction is stored and is not executed. Concurrently, the exception handler is called. The exception handler is executed at step 64. In the course of its execution, the exception handler can temporarily enter nontrapping mode to permit a reissued trapped instruction or another deimplemented instruction to be executed. Once the exception handler is done, method 60 resumes monitoring at step 62.

While the foregoing represents a preferred embodiment, the present invention provides for a range of alternatives. The "program-trap" instructions used to program the trap with the identities of implemented instructions can be of the "write coprocessor register" type, the "write to external memory" type, or the "write microprocessor register" type. Alternatively, instructions that were left reserved in previous generations of a microprocessor can be dedicated to trap programming for a microprocessor implementing the present invention. The "program-trap" instructions can either contain or directly or indirectly point to the identities of the instructions to be deimplemented.

The "program-trap" instructions must be implemented to be executed. However, to prevent accidently overwritting, execution of "program-trap" instructions can be limited to a non-user "supervisory" mode. One approach to limiting misuse of the "program-trap" instructions is to list them in a third section of the trap list which is read-only (like the unimplemented section) but traps only in trapping mode (like the deimplemented section). On system reset, the trap can be placed in nontrapping mode and the trap is programmed. Once the trap is programmed, the trap is set to trapping mode. Thence, the trap cannot be reprogrammed until nontrapping mode is set (presumably, by an exception handler or a system reset).

This same variety of instructions can be used to control trap mode. Two distinct instructions can be used to respective set trapping and nontrapping modes. Alternatively, a single instruction can be used to write a flag bit stored elsewhere into a list location to set either trapping or nontrapping mode according to the value of the bit. One cannot require that the trap be in nontrapping mode to execute an instruction to switch to nontrapping mode. Thus, either a separate supervisory mode should be used with trap mode instructions or else the user can be allowed access to trap mode.

In the preferred embodiment, an instruction is required to switch to nontrapping mode after an exception is detected. In an alternative embodiment, this switch occurs automatically (without an instruction). This approach is advantageous for cases where nontrapping mode is required, but requires an otherwise unnecessary instruction to switch back to trapping mode when nontrapping mode is not required.

An alternative to reissuing a nonproblematic deimplemented instructions is to allow the exception handler to untrap a trapped instruction, i.e., have the trapped instruction transferred from register EXC to INS for decoding and execution. However, a nontrapping mode is still desirable so that the exception handler can issue other deimplemented instructions. For example, where instructions of the form DIVIDEXY meaning divide the contents of register X by the value Y return invalid results when Y is between 10 and 19, all instructions of the form DIVIDEXY would be trapped. (X and Y are variables). Where Y is not between 20, the trapped instruction could be executed. Where Y is 15 the exception handler might multiply the contents of register X by 2 and then reissue the instruction as DIVIDEX30. This instruction should not be trapped, so a nontrapping mode is still desirable.

Detector 52 and decoder 54 receive instructions in parallel so that decoding can begin while possible matches are checked. Alternatively, an instruction decoder can receive untrapped instructions from a detector. In this case, the detector simply withholds trapped instructions from the instruction decoder. The exception register can be located within the detector instead of the instruction decoder. In such a case, the instruction decoding function can be treated as implemented by the execution unit rather than the trap.

This serial detector approach opens up to many alternatives in which the detector substitutes a call (or other branch) instruction for the trapped instruction. The calls can be assigned per deimplemented instruction location and can call exception handlers specific to the listed deimplemented instruction. The call instructions can be programmed along with deimplemented instructions so that the list becomes a look-up table.

In addition, the call instruction can carryover some bits from the trapped instruction perhaps saving steps of fetching and examining the trapped instruction. This approach is particularly valuable where conditions of conditional instructions are carried over to the call instructions. If the condition is not met, the call is not executed. In this case, instructions following the deimplemented instruction in an instruction pipeline need not be flushed by an exception handler (since it is not called).

Microprocessor 12 lacks a cache. Other embodiments can include one or more caches including an instruction cache. The presence of an instruction cache is nonproblematic as long as the trap is entirely downstream of the instruction cache. Otherwise, design of the trap is considerably more complex.

Pipelining is not employed by microprocessor 12: one instruction is completely executed before the next is fetched from main memory. Alternative embodiments employ pipelining of instructions so that one instruction can be executed, while a second is being decoded, while a third is being stored for decoding, while a fourth is being fetched. Pipelines of lesser and greater depths are provided for.

Pipelining imposes the following considerations. Trapping should not prevent execution of a prior untrapped instruction. Accordingly, some exception handling activities may have to be delayed pending execution of such untrapped instructions. In addition, instructions following a trapped instruction are going to be overwritten by the exception handler. These instructions will have be to restored to the pipeline. This will occur in due course once the address pointer is appropriately reset. However, resetting of the address pointer must take into account the pipeline depth. The address pointer points at the address of the last instruction in the pipeline rather than the trapped instruction. After execution handling, the address pointer should address the instruction immediately after the trapped instruction to refill the pipeline.

In some embodiments, the processor provides for conditionally executed instructions (as in the ARM processor manufactured by VLSI Technology, San Jose, Calif.). In these embodiments, the conditions are evaluated so that a deimplemented instruction is only trapped when the conditions are met. If the conditions are not met, the instruction is not trapped; instead, the instruction is treated as a "no-operation" instruction.

Deimplemented instructions are programmed into volatile memory in microprocessor 12. Alternatively, the deimplemented instruction can be programmed into nonvolatile memory. In this case, the instructions to program deimplemented instructions need not be included in the boot sequence. A program for making entries into the nonvolatile memory can be run once and then not used again.

In list 50, unimplemented instructions are stored in read-only memory, although they could be programmed along with deimplemented instructions. Implemented instructions can also be stored in the list in read only memory. For example, the instructions used to program the trap list can also be subject to trapping when the trap is in trapping mode. Unlike unimplemented instructions, no trap would issue for these instructions in nontrapping mode, which would then be used for programming the deimplemented instructions.

Trap mode can be set globally for all deimplemented instructions. Alternatively, a "trap-enable" bit can be set for each listed instruction. This provides for finer control of trapping by the exception handler and reduces the chances of unwitting execution of a problematic instruction during exception handling.

An undifferentiated trap indication can be provided for all trapped unimplemented and deimplemented instructions. This allows a single exception handler to handle all traps. Alternatively, different trap indications can be used to distinguish deimplemented traps from unimplemented traps. Furthermore, different trap indications can be used to distinguish the list locations of matched deimplemented instructions. The different trap indications can trigger different exception handler addresses and thus different exception handlers. This approach provides more advance information about the trapped instruction to the exception handler. This can reduce the amount of processing required to analyze the trapped instruction and even, in some cases, obviate the need to examine the trapped instruction. Thus, performance can be enhanced. In this approach, there would be several exception handler address registers corresponding to EHA in FIG. 1. Their contents could be stored in read-only memory or be programmable along with the deimplemented instructions.

The preferred embodiment has a single execution unit. In alternative embodiments, there can be distinct execution units, e.g., an integer unit, a floating-point unit, and a branch handling unit. However, these multiple units can be treated collectively as a functional unit so that the description above applies to this case as well.

It is contemplated that trap 26 is to be implemented on the same integrated circuit as execution unit 20. However, just as some microprocessors have multiple integrated circuit designs, it is possible to implement some or all of trap 26 on a separate integrated circuit. In other words, the relationship between silicon and function is flexible.

What the foregoing embodiments, variations and modifications share is the susceptibility to correction of logic design defects discovered after microprocessors have been in use. From the perspective of the microprocessor manufacturer, the problem is reduced to one of software distribution. From the perspective of the user, the problem is reduced to using received software to patch and update existing software. The defect is addressed with minimal impact on performance and compatibility. These above-described and other modifications to and variations upon the preferred embodiments are provided for by the present invention, the scope of which is limited only by the following claims.

What is claimed is:

1. A microprocessor comprising:

execution means for executing implemented instructions belonging to an implemented-instruction set; and trap means for alternatively allowing and preventing said execution means from executing received ones of said implemented instructions, said trap means allowing said execution unit to execute implemented instructions not in a deimplemented-instruction subset of deimplemented instructions, said deimplemented-instruction subset being a subset of said implemented instruction set, said trap means preventing said execution unit from executing a received one of said deimplemented instructions when a predetermined criterion is met, said trap means including writable memory into which said execution unit stores identification of deimplemented instructions belonging to said deimplemented-instruction subset in response to execution of a corresponding program-trap sequence of said implemented instructions, detection means for, when said predetermined criterion is met, determining whether or not a received program instruction belongs to said deimplemented-instruction subset, and exception register means for storing an instruction that said trap means prevents from being executed by said execution unit.

2. A microprocessor as recited in claim 1 wherein said trap means has alternative trapping and nontrapping modes of operation, said trap means preventing said execution means from executing a received deimplemented instruction when in said trapping mode, said trap means allowing said execution means to execute a received deimplemented instruction when in said nontrapping mode, said predetermined criterion being that said trap means is in said trapping mode.

3. A microprocessor as recited in claim 2 wherein said implemented instruction set includes one or more instructions for selecting each of said modes.

4. A microprocessor as recited in claim 3 wherein said trap means automatically enters said nontrapping mode upon detection of a deimplemented instruction while in said trapping mode.

5. A method of handling instructions that are defectively implemented on a microprocessor designed to execute instructions from an implemented-instruction set of implemented instructions, said method comprising the steps of:

a) using a sequence of said implemented instructions, programming a trap with the identities of deimplemented instructions belonging to a deimplemented-instruction subset of said implemented instruction set, said deimplemented-instruction subset including at least one of said defectively implemented instructions;

b) monitoring for deimplemented instructions while running a program of said implemented instructions;

c) upon detection of a deimplemented instruction, trapping the detected instruction and entering exception mode;

d) executing an exception handler; and e) resuming step b.

6. A method as recited in claim 5 wherein step c involves entering a nontrapping mode during which received deimplemented instructions are not trapped.

7. A method as recited in claim 5 wherein step d involves executing an instruction that causes a nontrapping mode to be entered during which received deimplemented instructions are not trapped.

8. A method as recited in claim 5 wherein step d involves executing an instruction to resume a trapping mode during which received deimplemented instructions are trapped.

* * * * *